US006364233B1

(12) United States Patent
Crowley

(10) Patent No.: US 6,364,233 B1
(45) Date of Patent: *Apr. 2, 2002

(54) TAKE-UP REEL ASSEMBLY WITH CUSHIONING MEMBER

(75) Inventor: William S. Crowley, Westminster, CO (US)

(73) Assignee: Storage Technology Corporation, Louisville, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/430,834

(22) Filed: Nov. 1, 1999

(51) Int. Cl.[7] .............................................. G11B 15/66
(52) U.S. Cl. ................. 242/332.8; 242/571; 242/587.2; 360/132
(58) Field of Search ........................... 242/332.8, 332.4, 242/348.2, 532.6, 587.2, 613, 345, 571; 360/132

(56) References Cited

U.S. PATENT DOCUMENTS

| 3,195,825 A | * | 7/1965 | Lonzil ...................... 242/332.8 |
| 4,626,950 A | * | 12/1986 | Livermore et al. ......... 242/613 |
| 5,431,356 A | | 7/1995 | Horstman et al. |
| 5,908,172 A | * | 6/1999 | Pierro et al. ................ 242/613 |

* cited by examiner

Primary Examiner—John Q. Nguyen
(74) Attorney, Agent, or Firm—Brooks & Kushman P.C.

(57) ABSTRACT

A take-up reel assembly for use with a tape cartridge in a cartridge-based tape transport includes a take-up reel and a leader block. The take-up reel is configured to receive tape from the cartridge and including an annular hub. The hub has an axis of rotation, an annular hub surface, and a hub slot extending from the hub surface toward the axis of rotation. The leader block is adapted to be attached to a free end of the tape and has a body disposable in the hub slot. The body has an arcuate end surface that is disposed proximate the hub surface when the body is disposed in the hub slot. One of the take-up reel and the leader block includes a cushioning member disposed on one of the hub surface and the end surface, respectively. The cushioning member is adapted to receive the tape thereon.

32 Claims, 4 Drawing Sheets

TAKE-UP REEL ASSEMBLY WITH CUSHIONING MEMBER

TECHNICAL FIELD

The invention relates to a take-up reel assembly for use with a tape cartridge in a tape transport, and the reel assembly includes a cushioning member for minimizing tape impressions.

BACKGROUND ART

Magnetic tape is frequently used to store digital data thereon. Such tape may be housed in a tape cartridge that protects the tape from damage. A leader block attached to a free end of the tape is used to withdraw the tape from the cartridge for read/write operations.

Read/write operations are performed by a tape transport that is configured to receive the cartridge. A threading mechanism grabs the leader block and pulls it free from the cartridge. The leader block is then used to thread the tape through a series of guide posts, across a longitudinal read/write head, and into a slot in a take-up reel. Once threaded, the tape from the cartridge can be driven across the read/write head for data transfer operations, and wound on a hub of the take-up reel.

The leader block and the take-up reel are precisely manufactured so that when the leader block is inserted into the slot in the take-up reel, the slot is sufficiently closed by an end of the leader block to create a relatively smooth surface on the hub of the take-up reel. Ideally, the leader block should cover the slot such that the interface between the end of the leader block and the hub is perfectly smooth. Such a perfectly smooth interface, however, is not practical to manufacture. Therefore, small discontinuities between the leader block and the hub are always present. Such discontinuities can cause impressions in the first wraps of the tape around the hub. These impressions may affect the retrievability of data stored on the tape, which results in data errors.

To ensure data integrity, a known practice involves not writing data to the portions of the tape having impressions. For example, if the first 100 wraps of the tape are effected by tape impressions, then no data is stored on the first 100 wraps of the tape. Such a practice, however, results in wasted data storage capability and wasted time.

U.S. Pat. No. 5,431,356 discloses a take-up reel assembly that is configured to reduce tape impressions. The take-up reel assembly includes a take-up reel having radiused hub edges, and a leader block that also has radiused edges. The edges of the leader block mate with the hub edges to form a continuous, relatively smooth surface on which tape may be wound.

DISCLOSURE OF INVENTION

The invention is an improved take-up reel assembly that includes at least one cushioning member for effectively minimizing tape impressions. Advantageously, the cushioning member significantly reduces or eliminates the effects of sharp edges that may be present on the take-up reel assembly.

Under the invention, a take-up reel assembly for use with a tape cartridge in a cartridge-based tape transport includes a take-up reel and a leader block. The take-up reel is configured to receive tape from the cartridge and includes an annular hub. The hub has an axis of rotation, an annular hub surface, and a hub slot extending from the hub surface toward the axis of rotation. The leader block is adapted to be attached to a free end of the tape and has a body disposable in the hub slot. The body has an arcuate end surface that is disposed proximate the hub surface when the body is disposed in the hub slot. One of the take-up reel and the leader block includes a cushioning member disposed on one of the hub surface and the end surface, respectively. The cushioning member is adapted to receive the tape thereon.

In one embodiment of the invention, the cushioning member is disposed on the hub surface, and cooperates with the leader block to substantially cover the hub slot when the leader block is positioned in the hub slot.

In another embodiment, the cushioning member is disposed on the end surface of the leader block, and cooperates with the take-up reel to substantially cover the hub slot. Furthermore, the cushioning member preferably has first and second tapered edges that mate with first and second hub edges.

In yet another embodiment, the take-up reel and the leader block are each provided with a cushioning member.

Preferably, the hub slot is tapered, and the body of the leader block is also tapered such that the body has a size and shape corresponding to the hub slot. Advantageously, such a configuration provides a tight fit between the hub slot and the leader block.

These and other objects, features and advantages of the invention are readily apparent from the following detailed description of the best modes for carrying out the invention when taken in conjunction with the accompanying drawings.

BEST MODES FOR CARRYING OUT THE INVENTION

Figure 1:
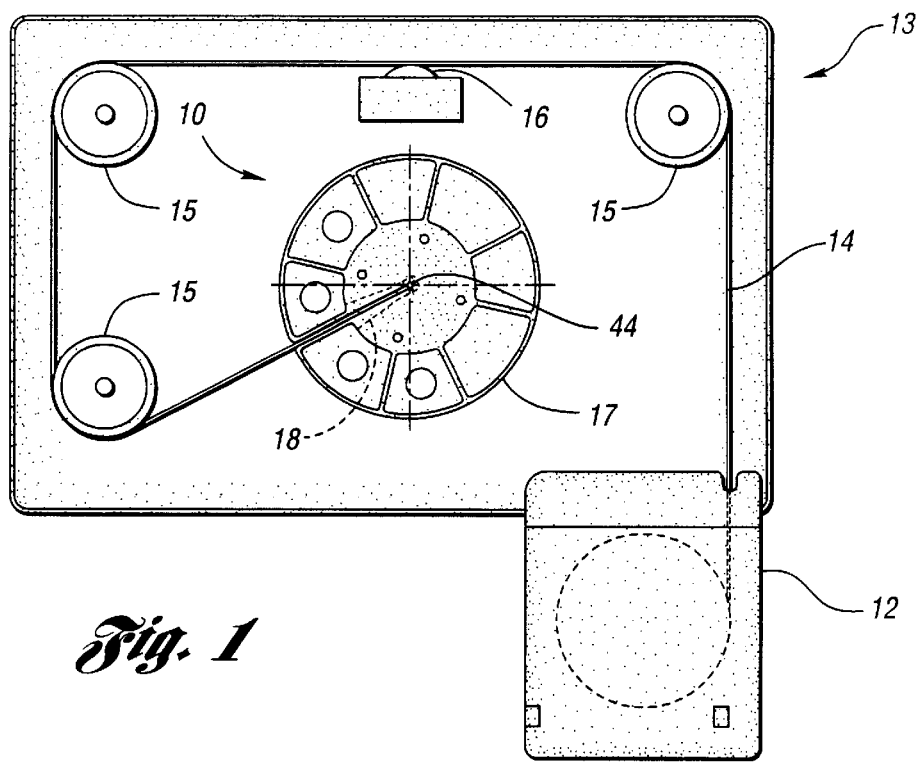
FIG. 1 is a schematic diagram of a take-up reel assembly according to the invention for use with a tape cartridge in a cartridge-based tape transport.

FIG. 1 shows an exemplary take-up reel assembly 10 according to the invention for use with a tape cartridge 12 in a cartridge-based tape transport 13. The tape cartridge 12 includes magnetic recording tape 14 wound on a supply reel, and the tape 14 includes multiple longitudinal tracks for storing data. The tape transport 13 includes multiple guide posts or bearings 15 and a read/write head 16 for performing read/write operations on the tape 14.

Figure 2:
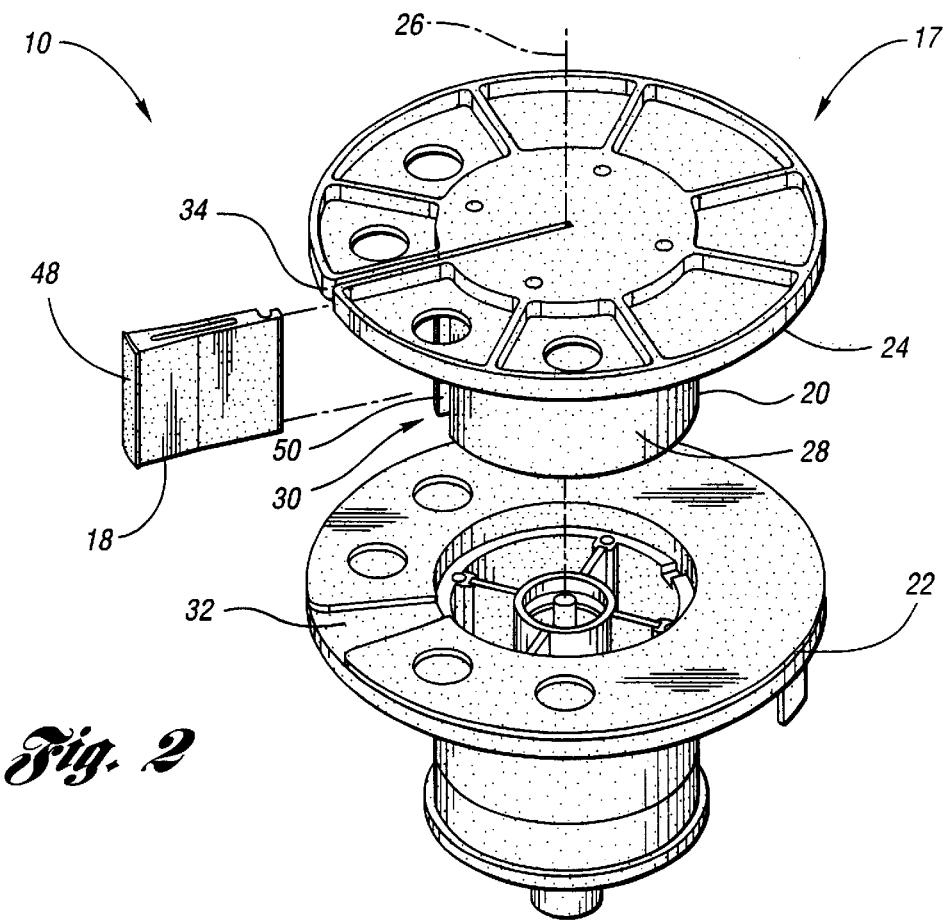
FIG. 2 is an exploded perspective view of the take-up reel assembly including a take-up reel and a leader block, the take-up reel having an annular hub and first and second tape guides.
Figure 3:
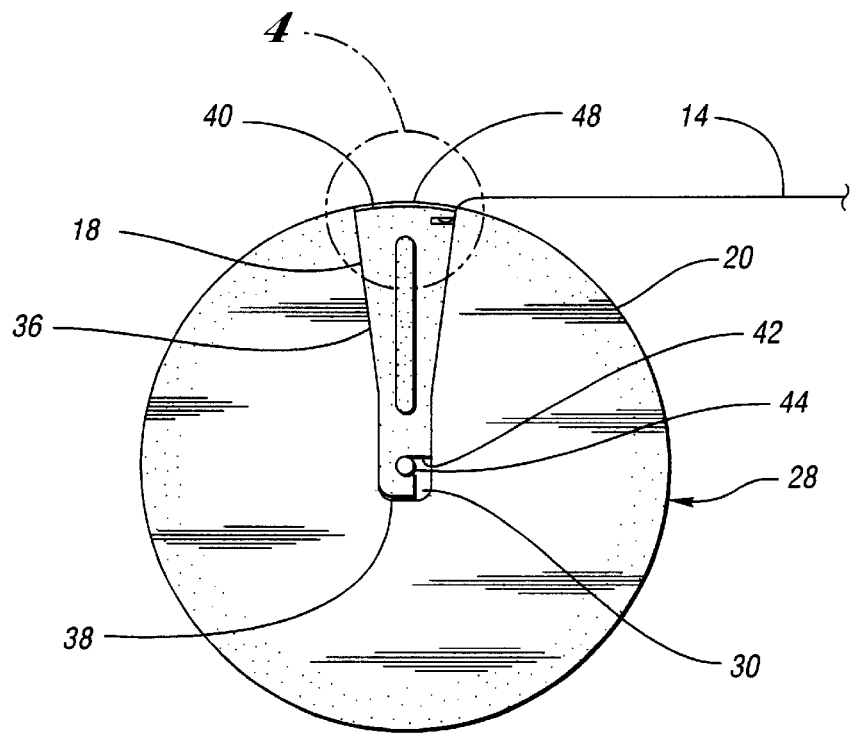
FIG. 3 is a top view of the take-up reel assembly with the tape guides removed, and showing the leader block disposed in a radial slot of the annular hub, wherein the leader block includes a cushioning member.

Referring to FIGS. 1 through 3, the take-up reel assembly 10 includes a take-up reel 17 and a leader block 18 attached to a free end of the tape 14. The take-up reel 17 is configured to couple with the leader block 18, and to allow tape 14 to be wound thereon. The take-up reel 17 includes a hub 20 and first and second tape guides 22 and 24, respectively. The hub 20 has an axis of rotation 26, an annular hub surface 28 and a radial hub slot 30 extending from the hub surface 28 toward the axis 26. While the hub slot 30 may have any suitable configuration to receive the leader block 18 therein, in a preferred embodiment, the hub slot 30 is tapered, as best shown in FIG. 3. Preferably, the taper angle of the hub slot 30 is in the range of 5 to 15 degrees. Alternatively, the hub slot 30 may have any suitable taper angle. The first and second tape guides 22 and 24 are also provided with first and second radial guide slots 32 and 34, respectively, to facilitate insertion of the leader block 18 into the hub slot 30.

Figure 4:
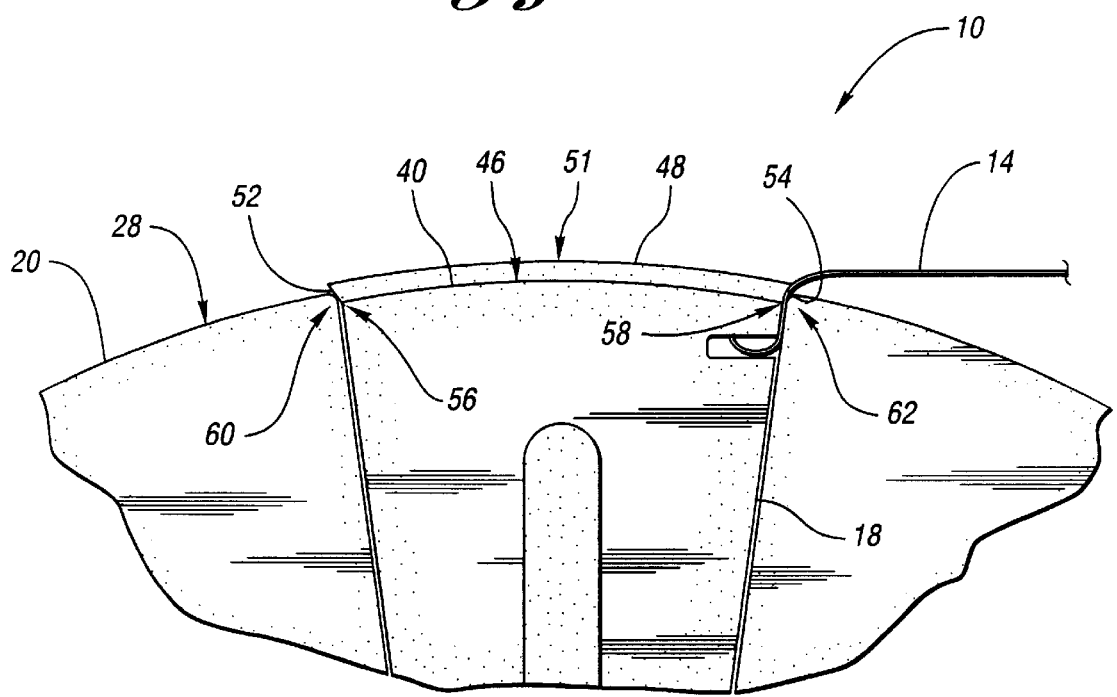
FIG. 4 is an enlarged view of a portion of FIG. 3 showing tapered edges of the cushioning member mating with edges of the hub.

The leader block 18 has a body 36 having first and second ends 38 and 40, respectively. The body 36 is preferably tapered, with a taper angle in the range of 5 to 15 degrees, and is configured to fit snugly in the hub slot 30. Advantageously, with such a configuration, the body 36 and the hub slot 30 preferably effect a taper lock therebetween. Alternatively, the body 36 may have any suitable configuration such that the body 36 is disposable in the hub slot 30. At the first end 38, the leader block 18 includes a notch or groove 42 that is configured to couple to a loading post 44 of the tape transport. As shown in FIG. 4, the second end 40 has a curved end surface 46 that is disposed proximate the hub surface 28 when the leader block 18 is disposed in the hub slot 30. The tape 14 is also coupled to the second end 40 or proximate to the second end 40.

The leader block 18 further includes a first cushioning member or cushion 48 attached to the end surface 46. When the leader block 18 is fully inserted into the hub slot 30, the first cushion 48 substantially covers end-opening 50 of hub slot 30, and is preferably raised slightly with respect to the hub surface 28. Furthermore, the first cushion 48 cooperates with the hub surface 28 to provide a continuous and relatively smooth surface for receiving the tape 14. While the first cushion 48 may be made of any suitable material and have any suitable thickness, the first cushion 48 preferably, but not necessarily, comprises rubber and/or silicone, and has a thickness in the range of 0.5 millimeters (mm) to 1.0 mm. The first cushion 48 also preferably, but not necessarily, has a varying compressibility that increases toward an exterior surface 51 of the first cushion 48. In other words, the first cushion 48 is preferably softer or more compressible toward the exterior surface 51 as compared with a portion of the first cushion 48 disposed adjacent to the hub surface 28. The first cushion 48 may be attached to the end surface 46 in any suitable manner such as with an adhesive. Alternatively or supplementally, the body 36 of the leader block 18 may comprise molded plastic that is molded to the first cushion 48.

Figure 5:
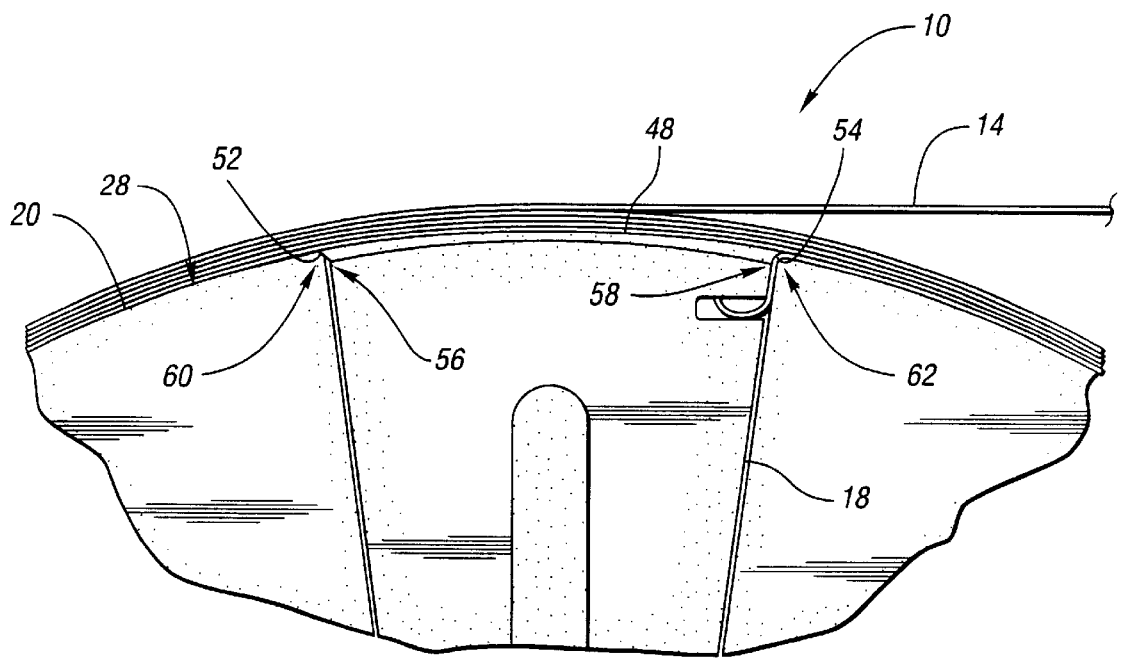
FIG. 5 is an enlarged view similar to FIG. 4 and showing tape wound around the cushioning member and the annular hub.

As further shown in FIG. 4, the first cushion 48 has first and second tapered edges 52 and 54, respectively, that extend beyond first and second leader-block edges 56 and 58, respectively, and mate with, or otherwise cooperate with, first and second hub edges 60 and 62, respectively. When the tape 14 is wound on the first cushion 48 and the hub surface 28, as shown in FIG. 5, the first cushion 48 is preferably flattened slightly to ensure that the tapered edges 52 and 54 sufficiently cover the leader-block edges 56 and 58, as well as the hub edges 60 and 62. As further shown in FIGS. 4 and 5, the hub edges 60 and 62 may be radiused to facilitate mating of the hub edges 60 and 62 with the tapered edges 52 and 54 of the first cushion 48.

To use the take-up reel assembly 10, the tape cartridge 12 is positioned in or proximate to the tape transport 13 shown in FIG. 1. The loading post 44 of the tape transport 13 is then used to engage the leader block 18 and pull it free from the cartridge 12. Next, the loading post 44 pulls the leader block 18 through or around the guide bearings 15, across the read/write head 16, and into the hub slot 30 in the take-up reel 17 to thereby thread the tape 14 through the tape transport 13. Once threaded, the tape 14 can be driven across the read/write head 16 for data transfer operations, and wound around the hub 20 of the take-up reel 17.

Advantageously, because the first cushion 48 sufficiently covers the leader-block edges 56 and 58 and the hub edges 60 and 62, the take-up reel assembly 10 effectively minimizes imprints or impressions on the tape 14 that may be caused by sharp edges. Consequently, the data storage capacity of the tape 14 is maximized.

Figure 6:
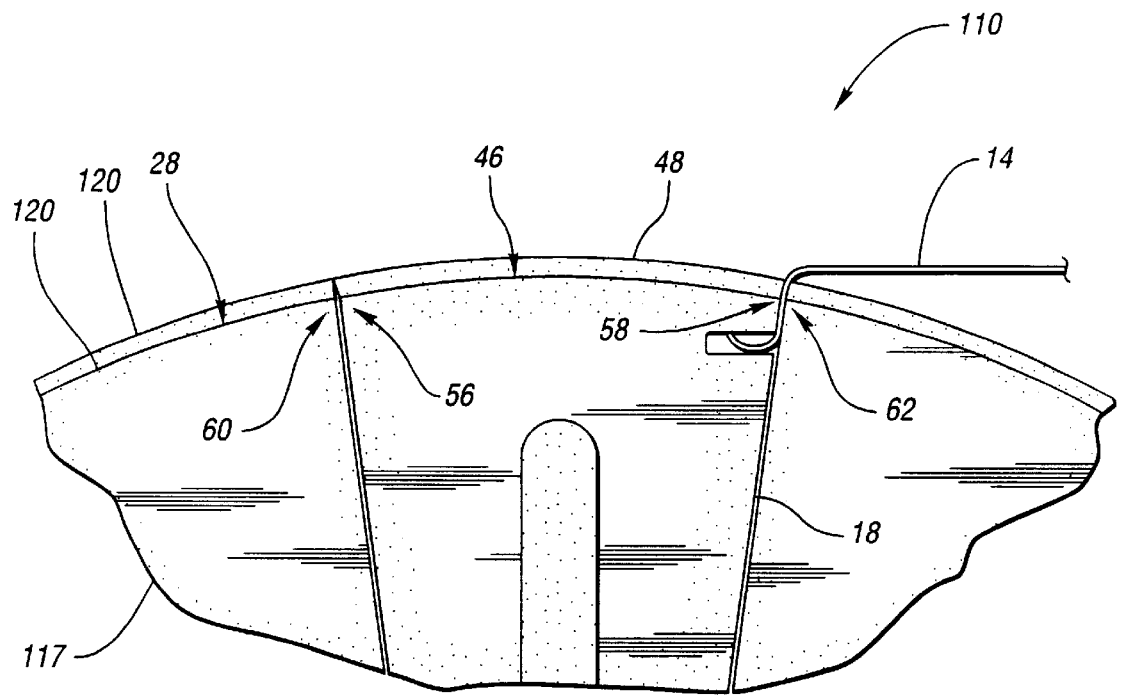
FIG. 6 is an enlarged view similar to FIG. 4 of a second embodiment of the take-up reel assembly including first and second cushioning members disposed on the leader block and the annular hub, respectively.

FIG. 6 shows a second embodiment 110 of the take-up reel assembly including a take-up reel 117 and the leader block 18 as described above in detail. The take-up reel 117 includes all of the features of the take-up reel 17, and further includes a second cushioning member or cushion 120 that mates with the first cushion 48 of the leader block 18. In this embodiment, however, the end surface 46 of the leader block 18 preferably has the same radius of curvature as the hub surface 28, such that the end surface 46 and the hub surface 28 cooperate to form a continuous surface.

While the second cushion 120 may comprise any suitable material, the second cushion preferably comprises foam rubber having similar characteristics as described with respect to the first cushion 48. Furthermore, the second cushion 120 may be attached to the hub 20 in any suitable manner such as with an adhesive. Alternatively or supplementally, the hub 20 may comprise molded plastic that is molded to the second cushion 120.

Advantageously, the first and second cushions 48 and 120 cooperate to effectively cover the leader-block edges 56 and 58 and the hub edges 60 and 62. Consequently, the take-up reel assembly 110 also effectively minimizes imprints or impressions on the tape 14 that may be caused by sharp edges.

The cushions 48 and 120 are also preferably configured such that the arcuate length of one or both of the cushions 48 and 120 is compressed slightly when the leader block 18 is fully inserted into the take-up reel 117. Such a configuration enables the cushions 48 and 120 to account for tolerance variations in the take-up reel assembly 110.

Figure 7:
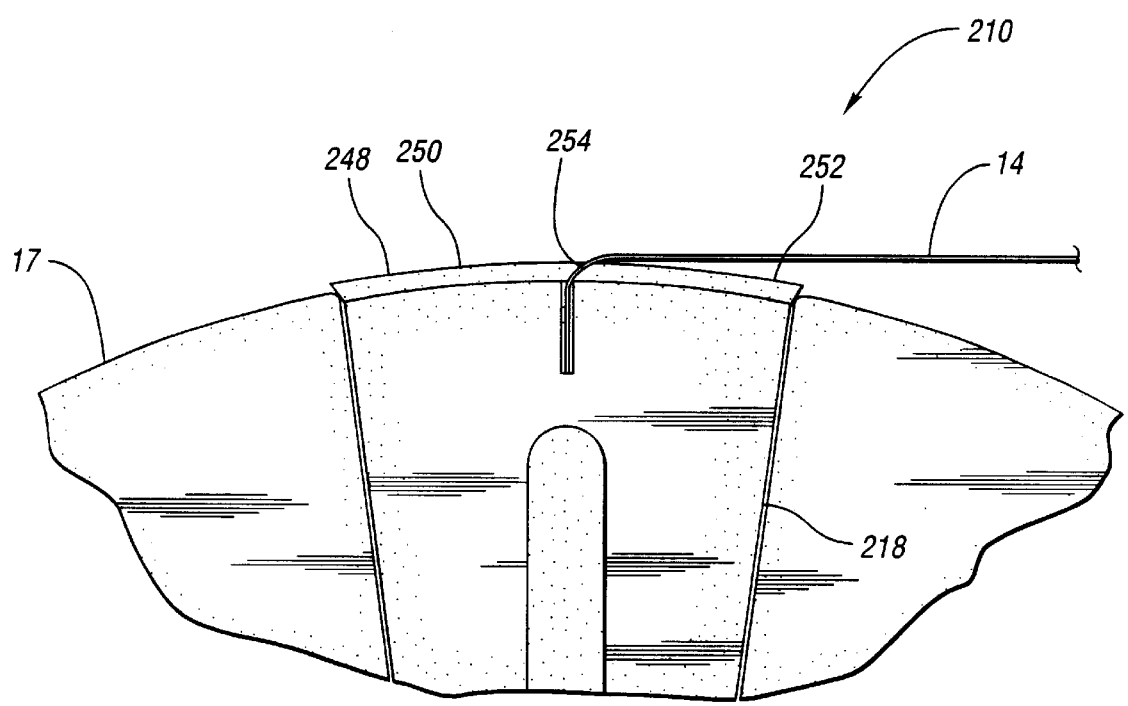
FIG. 7 is an enlarged view similar to FIG. 4 of a third embodiment of the take-up reel assembly including a leader block having a first cushioning member, wherein the cushioning member includes first and second portions that define a narrow opening therethrough.

FIG. 7 shows a third embodiment 210 of the take-up reel assembly including the take-up reel 17, as described above in detail, and a leader block 218. The leader block 218 is configured to be attached to tape 14 at a center portion of the leader block 218, instead of at a side portion such as with the leader block 18. Furthermore, the leader block 218 includes a first cushioning member or cushion 248 having first and second portions 250 and 252, respectively. The portions 250 and 252 cooperate to define a narrow opening or slit 254 for receiving the tape 14. The slit 254 is preferably angled toward a trailing end of the tape 14 so as to inhibit additional separation of the portions 250 and 252 as the tape 14 is wound around the take-up reel assembly 210.

Alternatively, a take-up reel assembly according to the invention may be provided with a take-up reel similar to the take-up reel 117, and a leader block similar to the leader block 218. As yet another alternative, a take-up reel assembly according to the invention may be provided with a take-up reel having a cushioning member, and a leader block without a cushioning member.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, the invention may be used in a two-reel tape cassette in which a distal end of a length of tape is permanently attached to a take-up reel. The attachment may be performed by a key piece that is snapped or otherwise secured in a matching groove in the take-up reel. Although the need for a removable leader block is not present, one or both of the key piece and groove may be provided with a cushioning member as described above to minimize tape imprints or impressions.

What is claimed is:

1. A take-up reel assembly for use with a tape cartridge in a cartridge-based tape transport, wherein the cartridge includes a length of tape stored on a supply reel, the take-up reel assembly comprising:

a take-up reel for receiving the tape from the cartridge and including an annular hub, the hub having an axis of rotation, an annular hub surface, and a hub slot extending from the hub surface toward the axis of rotation; and a leader block adapted to be attached to a free end of the tape and having a body disposable in the hub slot, the body having an arcuate end surface that is disposed proximate the hub surface when the body is disposed in the hub slot;

wherein one of the take-up reel and the leader block includes a cushioning member disposed on one of the hub surface and the end surface, respectively, the cushioning member being adapted to receive the tape thereon.

2. The take-up reel assembly of claim 1 wherein the hub slot is tapered, and the body of the leader block is tapered such that the body has a size and shape corresponding to the hub slot.

3. The take-up reel assembly of claim 1 wherein the take-up reel includes the cushioning member.

4. The take-up reel assembly of claim 3 wherein the cushioning member cooperates with the leader block to substantially cover the hub slot when the leader block is positioned in the hub slot.

5. The take-up reel assembly of claim 1 wherein the leader block includes the cushioning member.

6. The take-up reel assembly of claim 5 wherein the cushioning member cooperates with the take-up reel to substantially cover the hub slot when the leader block is positioned in the slot and the tape is received on the cushioning member, and wherein the take-up reel is provided without a cushioning member.

7. The take-up reel assembly of claim 5 wherein the hub has first and second hub edges, and the cushioning member has first and second tapered edges that substantially mate with the first and second hub edges, respectively, when the body is disposed in the hub slot.

8. The take-up reel assembly of claim 5 wherein the take-up reel further comprises an additional cushioning member disposed on the hub surface.

9. The take-up reel assembly of claim 8 wherein the hub has first and second hub edges and the body has first and second leader-block edges, and wherein the cushioning member and the additional cushioning member cooperate to cover the hub edges and the leader-block edges when the body is disposed in the hub slot.

10. The take-up reel assembly of claim 8 wherein the cushioning member has an arcuate length that is compressed when the body is disposed in the hub slot.

11. The take-up reel assembly of claim 10 wherein the additional cushioning member has an arcuate length that is compressed when the body is disposed in the hub slot.

12. The take-up reel assembly of claim 5 wherein the hub surface extends radially beyond the end surface when the leader block is disposed in the hub slot.

13. The take-up reel assembly of claim 5 wherein the hub extends radially beyond the body of the leader block when the body is disposed in the hub slot.

14. The take-up reel assembly of claim 5 wherein the cushioning member includes first and second portions that are adapted to receive the tape therebetween.

15. The take-up reel assembly of claim 5 wherein the cushioning member includes first and second portions that cooperate to define an opening between the portions for receiving the tape, the opening being angled toward a trailing edge of the tape when the tape is received in the opening.

16. The take-up reel assembly of claim 1 wherein the cushioning member has a thickness in the range of 0.5 mm to 1.0 mm.

17. A leader block for use with a tape cartridge and a cartridge-based tape transport, wherein the tape cartridge includes a length of tape stored on a supply reel, and wherein the transport includes a take-up reel for receiving the tape from the cartridge, the take-up reel including an annular hub having an axis of rotation, an annular hub surface, and a hub slot extending from the hub surface toward the axis of rotation, the leader block comprising:

a body disposable in the hub slot and having first and second ends, the first end being configured for coupling with a loading post of the transport, the second end having an -arcuate end surface; and a cushioning member disposed on the end surface and adapted to receive the tape thereon, the cushioning member being configured to minimize tape impressions.

18. The take-up reel assembly of claim 17 wherein the cushioning member has a thickness in the range of 0.5 mm to 1.0 mm.

19. The leader block of claim 17 wherein the body is tapered.

20. The leader block of claim 17 wherein the cushioning member is adapted to cooperate with the take-up reel to substantially cover the hub slot when the leader block is disposed in the hub slot and the tape is received on the cushioning member.

21. The leader block of claim 17 wherein the body is adapted to not extend radially as far as the hub when the body is disposed in the hub slot.

22. The leader block of claim 17 wherein the cushioning member has first and second tapered edges that are adapted to substantially mate with the hub when the body is disposed in the hub slot.

23. The leader block of claim 17 wherein the cushioning member includes first and second portions that are adapted to receive the tape therebetween.

24. The leader block of claim 17 wherein the cushioning member includes first and second portions that cooperate to define an opening between the portions for receiving the tape, the opening being angled toward a trailing edge of the tape when the tape is received in the opening.

25. A take-up reel for use with a tape cartridge in a cartridge-based tape transport, wherein the tape cartridge includes a length of tape stored on a supply reel and a leader block attached to a free end of the tape, the take-up reel comprising:

an annular hub having an axis of rotation, an annular hub surface, and a hub slot extending from the hub surface toward the axis of rotation for receiving the leader block; and a cushioning member disposed on the hub surface and adapted to receive the tape thereon, the cushioning member being configured to minimize tape impressions.

26. The take-up reel of claim 25 therein the hub slot is tapered.

27. The take-up reel of claim 25 wherein the cushioning member is adapted to cooperate with the leader block to substantially cover the hub slot when the leader block is received in the hub slot and the tape is received on the cushioning member.

28. A tape transport for receiving a tape cartridge having a length of tape stored on a supply reel, the transport comprising:

a take-up reel for receiving the tape from the cartridge and including an annular hub, the hub having an axis of rotation, an annular hub surface, and a hub slot extending from the hub surface toward the axis of rotation; and a leader block adapted to be attached to a free end of the tape and having a body disposable in the hub slot, the body having an arcuate end surface that is disposed proximate the hub surface when the body is disposed in the hub slot;

wherein one of the take-up reel and the leader block includes a cushioning member disposed on one of the hub surface and the end surface, respectively, the cushioning member being adapted to receive the tape thereon.

29. The tape transport of claim 28 wherein the cushioning member has a thickness in the range of 0.5 mm to 1.0 mm.

30. The tape transport of claim 28 wherein the leader block includes the cushioning member, and wherein the hub surface extends radially beyond the end surface of the leader block when the leader block is disposed in the hub slot.

31. The tape transport of claim 28 wherein the leader block includes the cushioning member and the cushioning member cooperates with the take-up reel to substantially cover the hub slot when the leader block is positioned in the hub slot and the tape is received on the cushioning member, and wherein the take-up reel is provided without a cushioning member.

32. The tape transport of claim 28 wherein the leader block includes the cushioning member, and wherein the hub extends radially beyond the body of the leader block when the body is disposed in the hub slot.

* * * * *